Figures 2A, 2B, 2C, 2D:
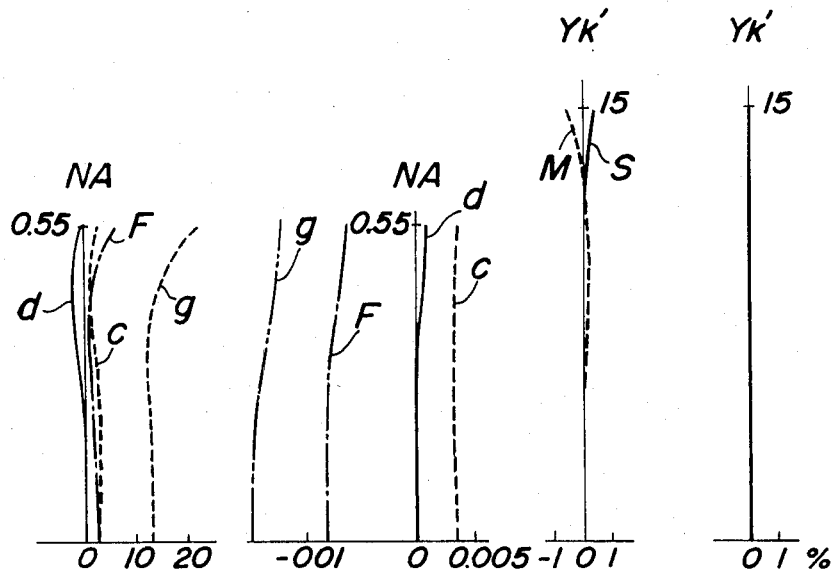
Figure 2E:
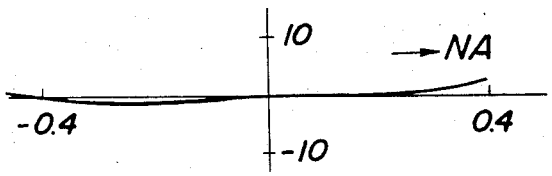
Figure 2F:
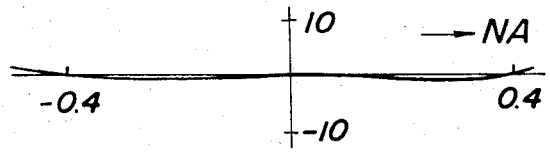

United States Patent
Taira

[11] 3,806,231
[45] Apr. 23, 1974

[54] OBJECTIVE LENS SYSTEMS HAVING A LARGE WORKING DISTANCE AND ADAPTED FOR USE IN MICROSCOPES

[75] Inventor: Akio Taira, Tokyo, Japan

[73] Assignee: Olympus Optical Company Limited, Tokyo, Japan

[22] Filed: Mar. 17, 1972

[21] Appl. No.: 235,712

[30] Foreign Application Priority Data
Mar. 17, 1971 Japan.................. 46-14587

[52] U.S. Cl............ 350/214, 350/175 ML, 350/177
[51] Int. Cl....................... G02b 9/64, G02b 21/02
[58] Field of Search............. 350/214, 175 ML, 177

[56] References Cited
UNITED STATES PATENTS
| | | | |
|---|---|---|---|
| 3,514,185 | 5/1970 | Matsuki | 350/214 X |
| 2,644,943 | 7/1953 | Klein | 350/175 ML UX |
| 3,537,773 | 11/1970 | Klein | 350/177 |
| 2,831,396 | 4/1958 | Klemt | 350/214 X |

Primary Examiner—John K. Corbin
Attorney, Agent, or Firm—Waters, Roditi, Schwartz & Nissen

[57] ABSTRACT

An objective lens system having a large work distance and adapted for use in microscopes, which is constructed as seven components and nine lenses and consists of a first component of convex meniscus lens that has at its object side a concave surface, second and third components of convex lenses, a fourth component of composite convex lens, a fifth component of composite meniscus lens that has at its image side a deep concave surface, a sixth component of meniscus lens that has at its object side a deep concave surface, and a seventh component of convex lens, all lenses being arranged in succession from the side of an object, and which is defined by the following four conditions, i.e.

I. $(n_7 - 1)/r_{12}$  $1/f$,
II. $(n_8 - 1)/r_{13}$  $1/f$,
III. $d_{10} + d_{11}$  $f$, and
IV. $\nu_4 - \nu_5$  70 where $n_1, n_2, \ldots n_9$ are refractive indexes of the successive lenses counted from the object side, $\nu_1, \nu_2, \ldots \nu_9$ are Abbe's numbers, $r_1, r_2, \ldots r_{16}$ are radii of curvatures of the lens surfaces, $d_1, d_2, \ldots d_{15}$ are air spaces between the successive lenses or axial thicknesses of the successive lenses, and $f$ is a composite focal length of the total lens system.

1 Claim, 7 Drawing Figures

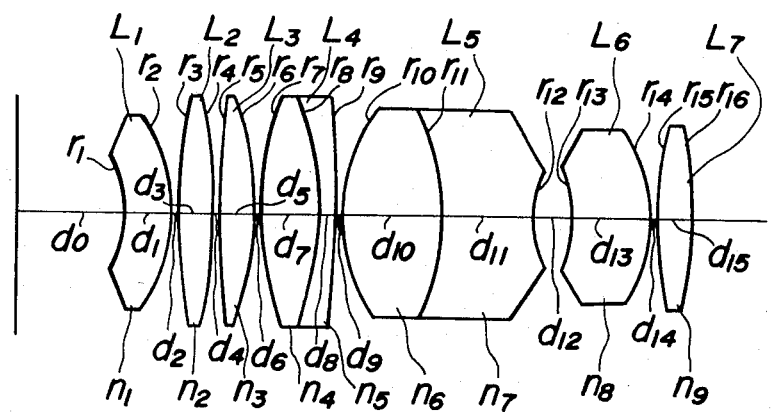
FIG_1

OBJECTIVE LENS SYSTEMS HAVING A LARGE WORKING DISTANCE AND ADAPTED FOR USE IN MICROSCOPES

This invention relates to objective lens systems having a large working distance and adapted for use in microscopes.

The conventional objective which has heretofore been used in microscopes has its magnification on the order of 40x, flat image surface, and working distance less than 20 percent of the focal distance. Thus, if the focal distance is 5 mm, for example, the working distance becomes shorter than 1 mm. In case of using such a kind of objective in factories, etc. for the purpose of testing minute test pieces, it is very difficult to operate the test pieces in a quick manner without injuring them. A plan objective having a large working distance tends to increase its chromatic aberration, spherical aberration and coma in dependence with an increase of the working distance. Many attempts have been made to provide an objective having a large working distance with significantly corrected chromatic aberration, spherical aberration, coma, etc. but hitherto none has led to fully satisfactory results.

The object of the invention, by adopting suitable dimensions for successive groups of lenses and suitable combination and arrangement thereof, is to provide an objective lens system whose magnification is 40x, working distance is more than 70 percent of the focal distance and the image surface at the field located at a distance which is longer than 5 times the focal length and having significantly corrected chromatic aberration, spherical aberration, coma, etc., and thus is adapted for use in microscopes.

A feature of the invention is the provision of an objective lens system having a large working distance and adapted for use in microscopes, which is constructed as seven components and nine lenses and consists of a first component of convex meniscus lens that has at its object side a concave surface, second and third components of convex lenses, a fourth component of composite convex lens, a fifth component of composite meniscus lens that has at its image side a deep concave surface, a sixth component of meniscus lens that has at its object side a deep concave surface, and a seventh component of convex lens, all lenses being arranged in succession from the side of an object, and which is defined by the following four conditions, i.e.

I. $(n_7 - 1)/r_{12} \geq 1/f$,

II. $(n_8 - 1)/|r_{13}| \geq 1/f$,

III. $d_{10} + d_{11} \geq f$, and

IV. $\nu_4 - \nu_5 \leq 70$ where $n_1, n_2, \ldots n_9$ are refractive indexes of the successive lenses counted from the object side, $\nu_1, \nu_2, \ldots \nu_9$ are Abbe's numbers, $r_1, r_2, \ldots r_{16}$ are radii of curvatures of the lens surfaces, $d_1, d_2, \ldots d_{15}$ are air spaces between the successive lenses or axial thicknesses of the successive lenses, and $f$ is a composite focal length of the total lens system.

For a better understanding of the invention, the same will be explained by reference to the accompanying drawings, in which:

FIG. 1 shows in cross-section an objective lens system constructed according to the invention; and FIGS. 2a to 2f show aberration characteristic curves of one embodiment of the invention.

Referring to the drawings, an objective lens system according to the invention is shown in FIG. 1 in which $L_1$ designates a first component of a convex meniscus lens that has at its object side a concave surface, $L_2$ and $L_3$ show second and third components of convex lenses, $L_4$ illustrates a fourth component of composite convex lens, $L_5$ is a fifth component of composite meniscus lens that has its image side a deep concave surface, $L_6$ designates a sixth component of meniscus lens that has at its object side a deep concave surface, and $L_7$ shows a seventh component of convex lens.

In accordance with the invention the refractive indexes, radii of curvatures and Abbe's numbers of the successive lenses are chosen such that they are defined by the following four conditions, i.e.

I. $(n_7 - 1)/r_{12} \geq 1/f$,

II. $(n_8 - 1)/|r_{13}| \geq 1/f$,

III. $d_{10} + d_{11} \geq f$, and

IV. $\nu_4 - \nu_5 \leq 70$ where $n_1, n_2, \ldots n_9$ are refractive indexes of the successive lenses counted from the object side, $\nu_1, \nu_2, \ldots \nu_9$ are Abbe's numbers, $r_1, r_2, \ldots r_{16}$ are radii of curvatures of the lens surfaces, $d_1, d_2, \ldots d_{15}$ are air spaces between the successive lenses or axial thicknesses of the successive lenses, and $f$ is a composite focal length of the total lens system.

In accordance with the invention the insertion of the second and third components of convex lenses $L_2$, $L_3$ into the lens system renderes it possible to make the correction of distortion excellent.

If either one of $r_{12}$ and $r_{13}$ is increased over the above conditions I and II, it becomes necessary to make $|r_1|$ extremely small in order to correct the curvature of the image surface, with the result that the spherical aberration becomes remarkably increased. Moreover, the distortion is also increased. If $d_{10} + d_{11}$ becomes decreased below $f$ as defined by the condition III, the coma and zonal spherical aberration are undesirably increased.

If the value of $\nu_4 - \nu_5$ as defined by the above condition IV becomes larger than 70, the chromatic aberration becomes remarkably increased in such an extent that the increased chromatic aberration could not be corrected by any other elements.

The invention will now be described with reference to the following example.

Example $f = 5.46$ mm, Magnification 40×

| | | | |
|---|---|---|---|
| $d_0$ 3.9 | | | |
| $r_1$ −7.65 | $d_1$ 1.8 | $n_1$ 1.56384 | $\nu_1$ 60.7 |
| $r_2$ −4.74 | $d_2$ 0.2 | | |
| $r_3$ 25.05 | $d_3$ 1.2 | $n_2$ 1.48656 | $\nu_2$ 84.5 |
| $r_4$ −16.42 | $d_4$ 0.2 | | |
| $r_5$ 39.51 | $d_5$ 1.3 | $n_3$ 1.43389 | $\nu_3$ 95.2 |
| $r_6$ −9.83 | $d_6$ 0.13 | | |
| $r_7$ 10.93 | $d_7$ 2.11 | $n_4$ 1.43389 | $\nu_4$ 95.2 |
| $r_8$ −9.49 | $d_8$ 0.64 | $n_5$ 1.6134 | $\nu_5$ 43.8 |
| $r_9$ −35.78 | $d_9$ 0.2 | | |

Various aberration characteristic curves of the present embodiment are shown in FIGS. 2a to 2f. FIG. 2a shows the spherical aberrations, FIG. 2b, the sign conditions, FIG. 2c the astigmatisms, FIG. 2d the distortion, and FIGS. 2e and 2f comas at the image heights of $Yk'=15$mm and $Yk'=10.5$mm, respectively.

As seen from these aberration characteristic curves, the lens system according to the present embodiment makes it possible to significantly correct various aberrations. Particularly, the distortion is remarkably corrected. Moreover, $d_0=3.9$mm which is equal to 71 percent of $f=5.46$mm shows that the work distance is considerably large if compared with the conventional objective whose $d_0$ is equal to less than 20 percent of $f$.

What is claimed is:

1. An objective lens system having a large working distance and adapted for use in microscopes, which is constructed as seven components and nine lenses and consists of a first component of convex meniscus lens that has at its object side a concave surface, second and third components of convex lenses, a fourth component of composite convex lens, a fifth component of composite meniscus lens that has at its image side a deep concave surface, a sixth component of meniscus lens that has at its object side a deep concave surface, and a seventh component of convex lens, all lenses being arranged in succession from the side of an object, and which is defined by the following four conditions, i.e.

I. $(n_7 - 1)/r_{12} \geq 1/f$,

II. $(n_8 - 1)/|r_{13}| \geq 1/f$,

III. $d_{10} + d_{11} \geq f$, and

IV. $\nu_4 - \nu_5 \leq 70$ where $n_1, n_2 \ldots n_9$ are refractive indexes of the successive lenses counted from the object side, $\nu_1, \nu_2, \ldots \nu_9$ are Abbe's numbers, $r_1, r_2, \ldots r_{16}$ are radii of curvatures of the lens surfaces, $d_1, d_2, \ldots d_{15}$ are air spaces between the successive lenses or axial thicknesses of the successive lenses, and $f$ is a composite focal length of the total lens system, $f$ being made 5.46 mm and the magnification being 40x and $r_1$ to $r_{16}$, $d_0$ to $d_{15}$, $n_1$ to $n_9$ and $\nu_1$ to $\nu_9$ being defined by the following values,

| r | d | n | ν |
|---|---|---|---|
| | $d_0$ 3.9 | | |
| $r_1$ −7.65 | | | |
| | $d_1$ 1.8 | $n_1$ 1.56384 | $\nu_1$ 60.7 |
| $r_2$ −4.74 | | | |
| | $d_2$ 0.2 | | |
| $r_3$ 25.05 | | | |
| | $d_3$ 1.2 | $n_2$ 1.48656 | $\nu_2$ 84.5 |
| $r_4$ −16.42 | | | |
| | $d_4$ 0.2 | | |
| $r_5$ 39.51 | | | |
| | $d_5$ 1.3 | $n_3$ 1.43389 | $\nu_3$ 95.2 |
| $r_6$ −9.83 | | | |
| | $d_6$ 0.13 | | |
| $r_7$ 10.93 | | | |
| | $d_7$ 2.11 | $n_4$ 1.43389 | $\nu_4$ 95.2 |
| $r_8$ −9.49 | | | |
| | $d_8$ 0.64 | $n_5$ 1.6134 | $\nu_5$ 43.8 |
| $r_9$ −35.78 | | | |
| | $d_9$ 0.2 | | |
| $r_{10}$ 6.16 | | | |
| | $d_{10}$ 3.5 | $n_6$ 1.48656 | $\nu_6$ 84.5 |
| $r_{11}$ −9.46 | | | |
| | $d_{11}$ 3.4 | $n_7$ 1.6727 | $\nu_7$ 32.1 |
| $r_{12}$ 2.656 | | | |
| | $d_{12}$ 1.53 | | |
| $r_{13}$ −2.463 | | | |
| | $d_{13}$ 2.7 | $n_8$ 1.618 | $\nu_8$ 63.4 |
| $r_{14}$ −4.52 | | | |
| | $d_{14}$ 0.16 | | |
| $r_{15}$ 12.91 | | | |
| | $d_{15}$ 1.24 | $n_9$ 1.48656 | $\nu_9$ 84.5 |
| $r_{16}$ −15.61 | | | |

* * * * *